US012628193B2

(12) United States Patent
Song et al.

(10) Patent No.: US 12,628,193 B2
(45) Date of Patent: May 12, 2026

(54) FREQUENCY BAND SCHEDULING METHOD, COMMUNICATION NODE, AND COMPUTER-READABLE STORAGE MEDIUM

(71) Applicant: ZTE CORPORATION, Shenzhen (CN)

(72) Inventors: Zhikang Song, Shenzhen (CN); Jiangyun Zhou, Shenzhen (CN); Meiying Wang, Shenzhen (CN); Lu Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 306 days.

(21) Appl. No.: 18/548,712

(22) PCT Filed: Jan. 28, 2022

(86) PCT No.: PCT/CN2022/074761
§ 371 (c)(1),
(2) Date: Sep. 1, 2023

(87) PCT Pub. No.: WO2022/183878
PCT Pub. Date: Sep. 9, 2022

(65) Prior Publication Data
US 2024/0147513 A1 May 2, 2024

(30) Foreign Application Priority Data
Mar. 3, 2021 (CN) .......................... 202110236699.1

(51) Int. Cl.
*H04W 72/541* (2023.01)
*H04L 5/00* (2006.01)
*H04W 72/0453* (2023.01)

(52) U.S. Cl.
CPC ......... *H04W 72/541* (2023.01); *H04L 5/0048* (2013.01); *H04W 72/0453* (2013.01)

(58) Field of Classification Search
CPC ........... H04W 72/541; H04W 72/0453; H04W 72/542; H04W 72/04; H04W 72/1215;
(Continued)

(56) References Cited

U.S. PATENT DOCUMENTS 10,499,270 B2 12/2019 Wen et al.
2012/0087273 A1* 4/2012 Koo ...................... H04W 16/02
370/252
(Continued)

FOREIGN PATENT DOCUMENTS

CN 103650562 A 3/2014
CN 104796939 A 7/2015
(Continued)

OTHER PUBLICATIONS

International Search Report in Application No. PCT/CN2022/074761, dated Mar. 25, 2022, 4 pages including translation.
(Continued)

*Primary Examiner* — Candal Elpenord
(74) *Attorney, Agent, or Firm* — Morgan, Lewis & Bockius LLP

(57) ABSTRACT

Provided are a frequency band scheduling method, a communication node, and a computer-readable storage medium. The method includes that: a reference frequency band and at least one detection frequency band are acquired, where the reference frequency band is a frequency band in which a first system does not interfere with a second system, and the at least one detection frequency band is a frequency band in which the first system and the second system interfere with each other; frequency band configuration information is sent to a terminal device, where the frequency band configuration
(Continued)

The network device acquires a reference frequency band and at least one detection frequency band, where the reference frequency band is a frequency band in which a first system does not interfere with a second system, and the at least one detection frequency band is a frequency band in which the first system and the second system interfere with each other — S110

The network device sends frequency band configuration information to a terminal device, where the frequency band configuration information includes configuration information of the reference frequency band and configuration information of all detection frequency bands — S120

The network device receives frequency band measurement information that the terminal device sends according to the frequency band configuration information, where the frequency band measurement information includes measurement information of the reference frequency band and measurement information of the all detection frequency bands — S130

The network device determines an available frequency band of the terminal device according to the frequency band measurement information — S140 information includes configuration information of the reference frequency band and configuration information of all detection frequency bands; frequency band measurement information that the terminal device sends according to the frequency band configuration information is received.

16 Claims, 4 Drawing Sheets

(58) Field of Classification Search
CPC ..... H04W 72/54; H04W 16/14; H04W 24/08; H04W 24/10; H04W 28/18; H04W 28/06; H04L 5/0048; H04B 7/309; H04B 7/382
USPC .................................................. 370/329–330
See application file for complete search history.

(56) References Cited

U.S. PATENT DOCUMENTS

| | | | | | |
|---|---|---|---|---|---|
| 2016/0157103 | A1* | 6/2016 | Teng | ................... | H04W 72/541 |
| | | | | | 370/329 |
| 2017/0085326 | A1* | 3/2017 | Li | ........................ | H04W 16/14 |
| 2017/0150388 | A1 | 5/2017 | Wen et al. | | |
| 2017/0201899 | A1* | 7/2017 | Guan | ................... | H04W 72/542 |
| 2020/0106577 | A1* | 4/2020 | Chen | ...................... | H04W 72/23 |
| 2020/0107299 | A1* | 4/2020 | Zhou | ................. | H04W 72/0446 |
| 2022/0021558 | A1* | 1/2022 | Chen | ................... | H04L 25/0202 |
| 2023/0403565 | A1* | 12/2023 | Bhuyan | ................ | H04B 17/336 |

FOREIGN PATENT DOCUMENTS

| | | | |
|---|---|---|---|
| CN | 105075318 | A | 11/2015 |
| CN | 105636113 | A | 6/2016 |
| CN | 106209277 | A | 12/2016 |
| JP | 2016-103691 | A2 | 6/2016 |
| WO | 2015000124 | A1 | 1/2015 |
| WO | WO2021/000776 | A1 | 1/2021 |

OTHER PUBLICATIONS

Extended European Search Report in Application No. 22762346.9, dated Dec. 23, 2024, 36 pages.
First Office Action in Chinese Application No. 202110236699.1, dated Mar. 7, 2026, 12 pages, including translation.

* cited by examiner

| D4 Frequency band | D5 Frequency band | D6 Frequency band | D1 Frequency band | D2 Frequency band | D3 Frequency band | D7 Frequency band | D8 Frequency band |
|---|---|---|---|---|---|---|---|

5G NR+LTE
(160MHz)

NR+LTE          NR+LTE

Cell 1          Cell 2

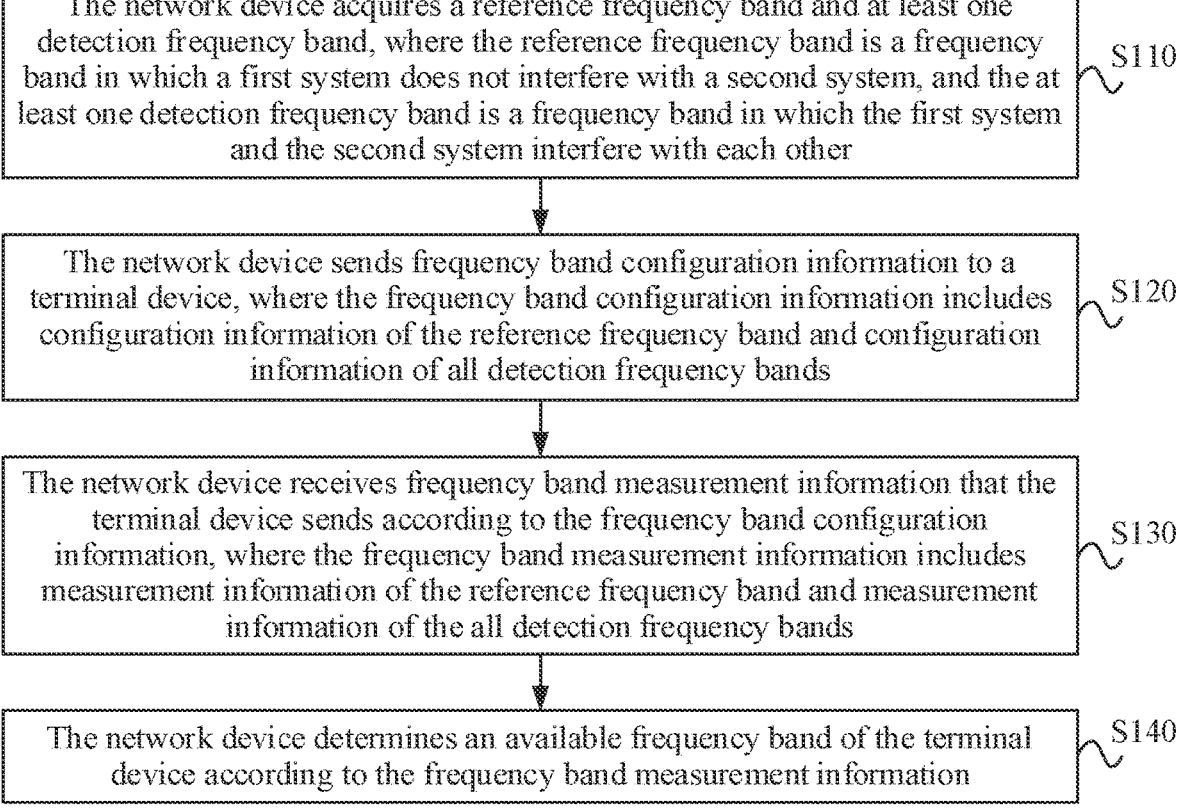

The network device acquires a reference frequency band and at least one detection frequency band, where the reference frequency band is a frequency band in which a first system does not interfere with a second system, and the at least one detection frequency band is a frequency band in which the first system and the second system interfere with each other — S110

The network device sends frequency band configuration information to a terminal device, where the frequency band configuration information includes configuration information of the reference frequency band and configuration information of all detection frequency bands — S120

The network device receives frequency band measurement information that the terminal device sends according to the frequency band configuration information, where the frequency band measurement information includes measurement information of the reference frequency band and measurement information of the all detection frequency bands — S130

The network device determines an available frequency band of the terminal device according to the frequency band measurement information — S140

FIG. 3

| BW 0 | BW 1 | BW 2 | ...... | BW n |
|------|------|------|--------|------|

FIG. 4

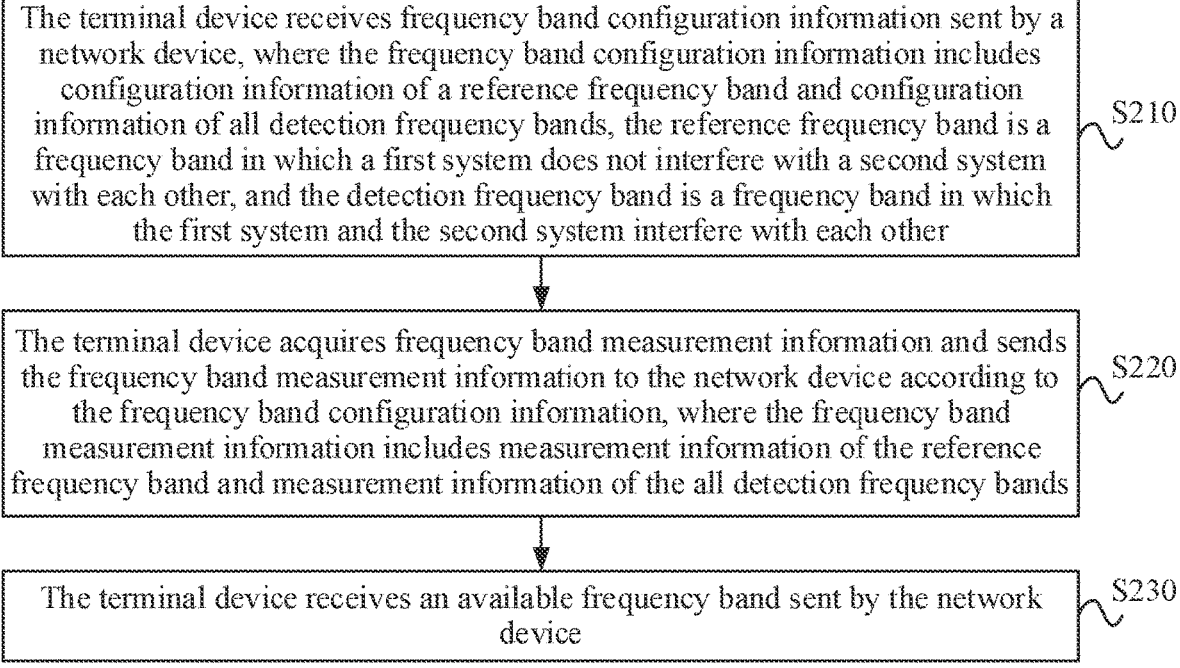

The terminal device receives frequency band configuration information sent by a network device, where the frequency band configuration information includes configuration information of a reference frequency band and configuration information of all detection frequency bands, the reference frequency band is a frequency band in which a first system does not interfere with a second system with each other, and the detection frequency band is a frequency band in which the first system and the second system interfere with each other    ⌇S210

The terminal device acquires frequency band measurement information and sends the frequency band measurement information to the network device according to the frequency band configuration information, where the frequency band measurement information includes measurement information of the reference frequency band and measurement information of the all detection frequency bands    ⌇S220

The terminal device receives an available frequency band sent by the network device    ⌇S230

FIG. 5

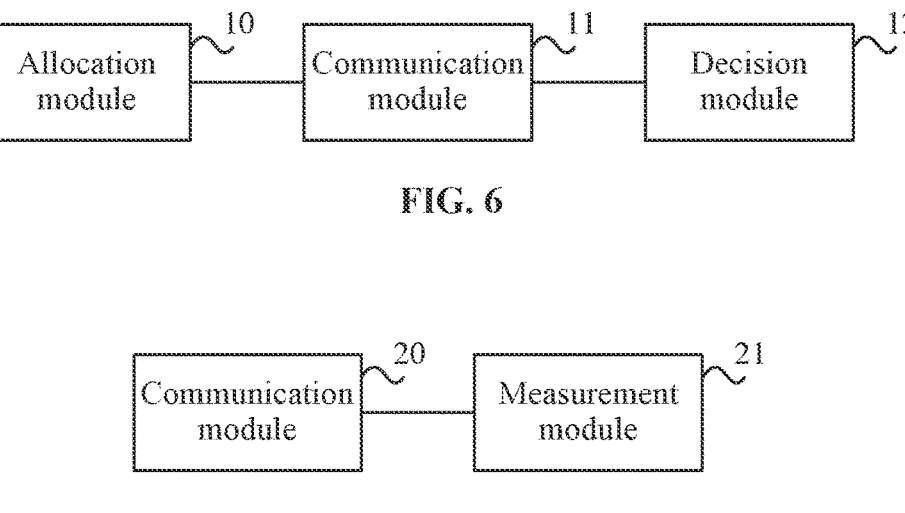

| Allocation module | ⌇10 | Communication module | ⌇11 | Decision module | ⌇12 |

FIG. 6

| Communication module | ⌇20 | Measurement module | ⌇21 |

FIG. 7

FREQUENCY BAND SCHEDULING METHOD, COMMUNICATION NODE, AND COMPUTER-READABLE STORAGE MEDIUM

CROSS REFERENCE TO RELATED APPLICATIONS

This is a National Stage Application, filed under 35 U.S.C. 371, of International Patent Application No. PCT/CN2022/074761, filed on Jan. 28, 2022, which is based on and claims priority to Chinese Patent Application No. 202110236699.1 filed with the China National Intellectual Property Administration (CNIPA) on Mar. 3, 2021, the disclosure of which is incorporated herein by reference in its entirety.

TECHNICAL FIELD

The present application relates to the technical field of communications, for example, to a frequency band scheduling method, a communication node, and a computer-readable storage medium.

BACKGROUND

With the rapid development of wireless communication technology, radio frequency bands are increasingly crowded. In order to ensure the normal communication quality, when the frequency band overlap exists between different systems (such as a new radio (NR) system and a long term evolution (LTE) system), the interference detection and its circumvention techniques are indispensable. However, the interference detection and its circumvention techniques in the related art are relatively limited, and the spectrum utilization rate is low, thereby affecting the transmission performance.

SUMMARY

Embodiments of the present application propose a frequency band scheduling method, a communication node and a computer-readable storage medium, which can determine the strength or weakness of frequency band interference between different systems in real time, so that an available frequency band of a terminal device is adjusted dynamically to obtain the better transmission performance.

An embodiment of the present application provides a frequency band scheduling method applied to a network device. The method includes that: a reference frequency band and at least one detection frequency band are acquired, where the reference frequency band is a frequency band in which a first system does not interfere with a second system, and the at least one detection frequency band is a frequency band in which the first system and the second system interfere with each other; frequency band configuration information is sent to a terminal device, where the frequency band configuration information includes configuration information of the reference frequency band and configuration information of all detection frequency bands; frequency band measurement information that the terminal device sends according to the frequency band configuration information is received, where the frequency band measurement information includes measurement information of the reference frequency band and measurement information of the all detection frequency bands; and an available frequency band of the terminal device is determined according to the frequency band measurement information.

An embodiment of the present application further provides a frequency band scheduling method applied to a terminal device. The method includes that: frequency band configuration information sent by a network device is received, where the frequency band configuration information includes configuration information of a reference frequency band and configuration information of all detection frequency bands, the reference frequency band is a frequency band in which a first system does not interfere with a second system with each other, and the detection frequency band is a frequency band in which the first system and the second system interfere with each other; frequency band measurement information is acquired and the frequency band measurement information is sent to the network device according to the frequency band configuration information, where the frequency band measurement information includes measurement information of the reference frequency band and measurement information of the all detection frequency bands; and an available frequency band sent by the network device is received.

An embodiment of the present application further provides a communication node. The communication node includes a processor, and the processor is configured to, when executing a computer program, implement the method of any of the embodiments described above.

An embodiment of the present application further provides a computer-readable storage medium. The computer-readable storage medium stores a computer program, and the computer program, when executed by a processor, implements the method of any of the embodiments described above.

According to the frequency band scheduling method, the communication node, and the computer-readable storage medium provided in the present application, the network device is configured to: acquire frequency band measurement information of a frequency band where the interference may exist by using the terminal device, and determine the strength or weakness of interference of the frequency band in real time. As such, the network device can dynamically adjust the available frequency band of the terminal device to obtain the better transmission performance.

Regarding the above-described embodiments and other aspects of the present application as well as implementations thereof, more explanation is provided in the accompanying drawings, detailed description, and claims.

BRIEF DESCRIPTION OF DRAWINGS

FIG. 3 is a flowchart of a frequency band scheduling method provided in an embodiment;

FIG. 4 is a schematic diagram of a division of a frequency band provided in an embodiment;

FIG. 5 is a flowchart of another frequency band scheduling method provided in an embodiment;

FIG. 6 is a schematic structural diagram of a network device provided in an embodiment;

FIG. 7 is a schematic structural diagram of a terminal device provided in an embodiment;

DETAILED DESCRIPTION

It should be understood that specific embodiments described herein are merely illustrative of the present application and are not intended to limit the present application.

In the following description, suffixes such as "module", "component", or "unit" used to indicate elements are used only for facilitating the explanation of the present application, and have no peculiar meaning by themselves. Thus, the "module", "component" or "unit" may be used mixedly.

Figures 1, 2:
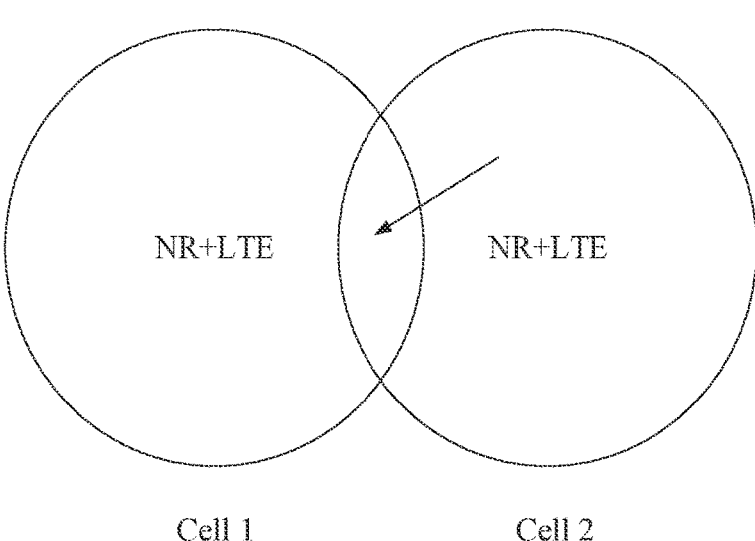
FIG. 1 is a schematic diagram of NR and LTE shared frequency bands in the related art.
FIG. 2 is a schematic diagram of an interference cell in the related art.

With the rapid development of wireless communication technology, radio frequency bands are increasingly crowded. In order to ensure the normal communication quality, when the frequency band overlap exists between different systems (such as NR and LTE), the same frequency band interference detection and its circumvention techniques of different systems are indispensable. For example, FIG. 1 shows a schematic diagram of NR and LTE shared frequency bands in the related art. Currently, 2.6 GHz frequency band in NR shares 40M frequency band with the LTE, such as a D1 frequency band and a D2 frequency band as indicated by shaded portions in FIG. 1. When the LTE is not fully frequency shifted, the NR may suffer from the traffic interference and/or the reference signal interference of the LTE such as a cell reference signal (CRS) interference and a physical downlink shared channel (PDSCH) interference.

Current interference detection and its circumvention techniques generally adopt three schemes as follows.

Scheme one: when the frequency band overlap exists between the NR and the LTE, the NR directly does not use the overlapping frequency band, for example, the NR shares 40 MHz frequency band with the LTE in 100 MHz frequency band, then only 60 MHz frequency band is finally available for the NR. The disadvantage of this scheme is that when the interference ratio is relatively small, the spectrum utilization rate is low due to the drop in available frequency bands.

Scheme two: when the frequency band overlap exists between the NR and the LTE, the NR does not perform the circumvention and still uses the overlapping frequency band. The disadvantage of this scheme is that when the overlapping frequency band is more interfered, the NR uses the interfered frequency band, and the actual spectral utilization rate will also be low.

Scheme three: when the NR and the LTE interact (also referred to as spectrum sharing), that is, the NR and the LTE are co-sited, the NR may determine whether the NR uses a shared frequency band according to the load of the LTE, thereby circumventing the interference to the NR by co-sited LTE. The disadvantage of this scheme is that the NR can only circumvent the interference of the co-sited LTE, and when a pro-sited LTE also exists, the NR cannot circumvent the interference of non-co-sited LTE cells due to the inability of the NR to acquire related information of the pro-sited LTE. FIG. 2 shows a schematic diagram of an interference cell in the related art. As shown in FIG. 2, both a cell 1 and a cell 2 cover the NR and the LTE, the cell 1 cannot acquire LTE information of the cell 2, and the LTE of the cell 2 is actually an interfering signal for the cell 1.

In summary, the interference detection and its circumvention techniques in the related art are relatively limited, the interference cannot be determined in real time, and the spectrum utilization rate is low, thereby affecting the transmission performance. In order to avoid the above-described situation, an embodiment of the present application provides a mobile communication network (including but not limited to 5th Generation (5G)), the network architecture of the network may include a terminal device and a network side device (which may also be referred to as a network device or an access network device). The terminal device is connected to the network device in a wireless manner, and the terminal device may be fixed-location or movable. In embodiments of the present application, there are provided a frequency band scheduling method, a communication node and a computer-readable storage medium operable on the above-described network architecture, which can determine the strength or weakness of frequency band interference between different systems in real time, so that the available frequency band of the terminal device is adjusted dynamically to obtain the better transmission performance.

The network device is an access device that the terminal device accesses into a mobile communication system in a wireless manner. The network device may be a base station, an evolved NodeB (eNodeB), an integrated access and backhaul (IAB) node, a relay node (RN), a transmission reception point (TRP), an access point (AP), a next generation NodeB (gNB) in a 5G mobile communication system, a base station in a future mobile communication system or an access node in a WiFi system and the like. The network device may also be a module or unit that performs part of the functions of the base station, for example, it may be a central unit (CU), it may also be a distributed unit (DU), or an IAB-mobile-termination (MT), IAB-DU. The embodiments of the present application do not limit the specific techniques and the specific device modalities adopted by the network device.

The terminal device may also be referred to as a terminal, a user equipment (UE), a mobile station, a mobile terminal and the like. The terminal device may be a mobile phone, a tablet computer, a computer with a wireless transceiving function, a virtual reality terminal device, an augmented reality terminal device, a wireless terminal in industrial control, a wireless terminal in unmanned driving, a wireless terminal in remote operation, a wireless terminal in a smart grid, a wireless terminal in transportation safety, a wireless terminal in a smart city, a wireless terminal in a smart home, an IAB-MT and the like. The embodiments of the present application do not limit the specific techniques and the specific device modalities adopted by the terminal device.

In the following description, the schemes provided by the embodiments of the present application are described in conjunction with the network device and the terminal device. In the description of the present application, the terms "system" and "network" are often used interchangeably in the present application. The terms such as "first", "second" and "third" are used only for purposes of distinguishing description, and are not to be construed as indicating or implying the relative importance or the order. A first system and a second system mentioned in the embodiments of the present application are different communication systems from each other, for example, the first system is the NR and the second system is the LTE. The following embodiments of the present application may be implemented individually or in combination, and the embodiments of the present application are not limited in this respect.

FIG. 3 shows a flowchart of a frequency band scheduling method provided in an embodiment. As shown in FIG. 3, the method provided in this embodiment is applicable to a network device (such as a base station), and the method includes the following processes.

In S110, the network device acquires a reference frequency band and at least one detection frequency band, where the reference frequency band is a frequency band in which a first system does not interfere with a second system, and the at least one detection frequency band is a frequency band in which the first system and the second system interfere with each other.

For example, the network device referred to in the embodiments of the present application is the network device of the first system. The method of acquiring the reference frequency band and the at least one detection frequency band in the process S110 may include the following two processes.

In process a1, the network device divides a frequency band of the first system into an interference-free frequency band and an interference frequency band.

In process a2, the network device uses the interference-free frequency band as the reference frequency band, and divides the interference frequency band into the at least one detection frequency band according to a granularity of the second system.

Exemplarily, FIG. 4 shows a schematic diagram of a division of a frequency band provided in an embodiment. As shown in FIG. 4, the frequency band of the first system is divided into an interference-free frequency band BW 0, and the interference frequency band is divided into n detection frequency bands (i.e., a detection frequency band BW 1, a detection frequency band BW 2, . . . , a detection frequency band BW n) according to the granularity of the second system. It should be noted that a number of detection frequency bands may be one or more.

The granularity refers to a minimum value of a system memory expansion increment. The higher the granularity refinement degree is, the smaller the granularity level is. Conversely, the lower the granularity refinement degree is, the larger the granularity level is. Dividing the interference frequency band according to the granularity of the second system may ensure that the detection frequency band is coincide with the granularity of the second system.

In S120, the network device sends frequency band configuration information to a terminal device, where the frequency band configuration information includes configuration information of the reference frequency band and configuration information of all detection frequency bands.

In an embodiment, the configuration information is a channel state information-reference signal (CSI-RS) configuration.

In S130, the network device receives frequency band measurement information that the terminal device sends according to the frequency band configuration information, where the frequency band measurement information includes measurement information of the reference frequency band and measurement information of the all detection frequency bands.

In an embodiment, the measurement information is channel state information (CSI).

For the reference frequency band, since the configuration of the reference frequency band is periodic, the method of receiving the frequency band measurement information sent by the terminal device according to the frequency band configuration information in process S130 may include a process b1. For the detection frequency band, since the configuration of the detection frequency band is aperiodic, the method of receiving the frequency band measurement information sent by the terminal device according to the frequency band configuration information in process S130 may include processes b2 and b3.

In process b1, the network device periodically receives the measurement information of the reference frequency band sent by the terminal device.

For the reference frequency band in which the configuration is periodic, the network device does not need to send frequency band detection indication, and the terminal device will timely perform the measurement on the reference frequency band, and send the measurement information of the reference frequency band to the network device. The network device only needs to periodically receive the measurement information of the reference frequency band sent by the terminal device.

In process b2, the network device sends a frequency band detection indication to the terminal device at an interference detection occasion.

In process b3, the network device receives the measurement information of the all detection frequency bands sent by the terminal device.

For the detection frequency band in which the configuration is aperiodic, the network device firstly needs to determine whether the interference detection occasion is reached; when the interference detection occasion is reached, the network device sends the frequency band detection indication to the terminal device, so that the terminal device performs the measurement on the all detection frequency bands according to the frequency band detection indication, and sends the measurement information of the all detection frequency bands to the network device at the reporting occasion point.

In S140, the network device determines an available frequency band of the terminal device according to the frequency band measurement information.

For example, the method of determining the available frequency band of the terminal device according to the frequency band measurement information in the process S140 may include the following two processes.

In process c1, the network device acquires j detection frequency bands satisfying a preset condition from i detection frequency bands according to the frequency band measurement information, where $i \geq 1$, $0 \leq j \leq i$, and i and j are integers.

The network device determines whether a difference value between measurement information of an x-th detection frequency band and the measurement information of the reference frequency band is greater than a preset threshold. If the difference value between the measurement information of the x-th detection frequency band and the measurement information of the reference frequency band is greater than the preset threshold, then it is indicated that the x-th detection frequency band does not satisfy the preset condition. If the difference value between the measurement information of the x-th detection frequency band and the measurement information of the reference frequency band is not greater than the preset threshold, then it is indicated that the x-th detection frequency band satisfies the preset condition, where x is an integer, and x is gradually increased from 1 to i in units of 1.

That is, the network device makes x=1, and then determines whether the difference value between the measurement information of the x-th detection frequency band and the measurement information of the reference frequency band is greater than the preset threshold. If the difference value between the measurement information of the x-th detection frequency band and the measurement information of the reference frequency band is greater than the preset threshold, then it is indicated that the x-th detection frequency band does not satisfy the preset condition. If the difference value between the measurement information of the x-th detection frequency band and the measurement information of the reference frequency band is not greater than the preset threshold, then it is indicated that the x-th detection frequency band satisfies the preset condition. The network device makes x=x+1, and then returns to the process of determining whether the difference value between the measurement information of the x-th detection frequency band and the measurement information of the reference frequency band is greater than the preset threshold until x=i.

In process c2, the network device uses the j detection frequency bands and the reference frequency band as the available frequency band of the terminal device.

It is assumed that the frequency band of the first system is divided into a reference frequency band BW 0, the detection frequency band BW 1, the detection frequency band BW 2 and the detection frequency band BW 3, the value of measurement information of the reference frequency band BW 0 is configured as 10, the value of measurement information of the detection frequency band BW 1 is configured as 10, the value of measurement information of the detection frequency band BW 2 is configured as 5, the value of measurement information of the detection frequency band BW 3 is configured as 1, and the value of the preset threshold is configured as 3. Firstly, the network device calculates that a difference value between the measurement information of the detection frequency band BW 1 and the measurement information of the reference frequency band BW 0 is 0 and is less than the preset threshold of 3, then the detection frequency band BW 1 satisfies the preset condition, and the detection frequency band BW 1 is available. Secondly, the network device calculates that a difference value between the measurement information of the detection frequency band BW 2 and the measurement information of the reference frequency band BW 0 is 5 and is greater than the preset threshold of 3, then the detection frequency band BW 2 does not satisfy the preset condition, and the detection frequency band BW 2 is not available. Finally, the network device calculates that a difference value between the measurement information of the detection frequency band BW 3 and the measurement information of the reference frequency band BW 0 is 9 and is greater than the preset threshold of 3, then the detection frequency band BW 3 does not satisfy the preset condition, and the detection frequency band BW 3 is not available. Finally, the available frequency band of the terminal device is the reference frequency band BW 0 and the detection frequency band BW 1.

The network device sends the available frequency band of the terminal device to the terminal device, so that the terminal device uses the available frequency band for data transmission.

Apparently, it should be understood that after the network device uses the j detection frequency bands and the reference frequency band as the available frequency band of the terminal device, the network device may also determine that a communication quality at a previous occasion of the terminal device (i.e., a state before acquiring the available frequency band) is superior to a communication quality at a current occasion. If the communication quality at the previous occasion of the terminal device is superior to the communication quality at the current occasion, then the reference frequency band is configured as the available frequency band of the terminal device, or a use frequency band of the terminal device is returned to the previous occasion. If the communication quality at the previous occasion of the terminal device is not superior to the communication quality at the current occasion, then the current situation is kept unchanged. Therefore, more robust transmission performance is obtained, and the misjudgment of the network device caused by mismeasurement of the terminal device is avoided.

For example, the communication quality of the terminal device may be obtained by at least one of an interference measurement (such as, measurement of CSI information), a transmission speed measurement, or a frequency band utilization rate measurement.

The embodiment of the present application provides the frequency band scheduling method applied to the network device. The method includes that: the reference frequency band and the at least one detection frequency band are acquired, where the reference frequency band is the frequency band in which the first system does not interfere with the second system, and the at least one detection frequency band is the frequency band in which the first system and the second system interfere with each other; the frequency band configuration information is sent to the terminal device, where the frequency band configuration information includes the configuration information of the reference frequency band and the configuration information of the all detection frequency bands; the frequency band measurement information that the terminal device sends according to the frequency band configuration information is received, where the frequency band measurement information includes the measurement information of the reference frequency band and the measurement information of the all detection frequency bands; and the available frequency band of the terminal device is determined according to the frequency band measurement information. The network device is configured to: acquire frequency band measurement information of a frequency band where the interference may exist by using the terminal device, and determine the strength or weakness of interference of the frequency band in real time. As such, the network device can dynamically adjust the available frequency band of the terminal device to obtain the better transmission performance.

FIG. 5 shows a flowchart of another frequency band scheduling method provided in an embodiment. As shown in FIG. 5, the method provided in this embodiment is applicable to a terminal device (such as, a UE), and the method includes the following processes.

In S210, the terminal device receives frequency band configuration information sent by a network device, where the frequency band configuration information includes configuration information of a reference frequency band and configuration information of all detection frequency bands, the reference frequency band is a frequency band in which a first system does not interfere with a second system with each other, and the detection frequency band is a frequency band in which the first system and the second system interfere with each other.

In an embodiment, the frequency band configuration information is a CSI-RS configuration.

In S220, the terminal device acquires frequency band measurement information and sends the frequency band measurement information to the network device according to the frequency band configuration information, where the frequency band measurement information includes measurement information of the reference frequency band and measurement information of the all detection frequency bands.

In an embodiment, the measurement information is channel state information.

For the reference frequency band, since the configuration of the reference frequency band is periodic, the method of acquiring the frequency band measurement information and sending the frequency band measurement information to the network device in the process S220 may include a process d1. For the detection frequency band, since the configuration of the detection frequency band is aperiodic, the method of acquiring the frequency band measurement information and sending the frequency band measurement information to the network device in the process S220 may include processes d2 and d3.

In process d1, the terminal device periodically performs measurement on the reference frequency band, and sends the measurement information of the reference frequency band to the network device.

For the reference frequency band in which the configuration is periodic, the network device does not need to send a frequency band detection indication, and the terminal device will timely perform the measurement on the reference frequency band, and send the measurement information of the reference frequency band to the network device.

In process d2, the terminal device receives a frequency band detection indication sent by the network device at an interference detection occasion.

In process d3, the terminal device performs measurements on the all detection frequency bands according to the frequency band detection indication, and sends the measurement information of the all detection frequency bands to the network device.

For the detection frequency band in which the configuration is aperiodic, the network device firstly needs to determine whether the interference detection occasion is reached; when the interference detection occasion is reached, the network device sends the frequency band detection indication to the terminal device, so that the terminal device performs the measurement on the all detection frequency bands according to the frequency band detection indication, and sends the measurement information of the all detection frequency bands to the network device at the reporting occasion point.

In S230, the terminal device receives an available frequency band sent by the network device.

Therefore, the terminal device may use the available frequency band for data transmission.

The embodiment of the present application provides the frequency band scheduling method applied to the terminal device. The method includes that: the frequency band configuration information sent by the network device is received, where the frequency band configuration information includes the configuration information of the reference frequency band and the configuration information of the all detection frequency bands, the reference frequency band is the frequency band in which the first system does not interfere with the second system with each other, and the detection frequency band is the frequency band in which the first system and the second system interfere with each other; the frequency band measurement information is acquired and the frequency band measurement information is sent to the network device according to the frequency band configuration information, where the frequency band measurement information includes the measurement information of the reference frequency band and the measurement information of the all detection frequency bands; and the available frequency band sent by the network device is received. The network device is configured to: acquire frequency band measurement information of a frequency band where the interference may exist by using the terminal device, and determine the strength or weakness of interference of the frequency band in real time. As such, the network device can dynamically adjust the available frequency band of the terminal device to obtain the better transmission performance.

FIG. 6 shows a schematic structural diagram of a network device provided in an embodiment. As shown in FIG. 6, the network device includes an allocation module 10, a communication module 11 and a decision module 12.

The allocation module 10 is configured to acquire a reference frequency band and at least one detection frequency band, where the reference frequency band is a frequency band in which a first system does not interfere with a second system, and the at least one detection frequency band is a frequency band in which the first system and the second system interfere with each other.

The communication module 11 is configured to: send frequency band configuration information to a terminal device, where the frequency band configuration information includes configuration information of the reference frequency band and configuration information of all detection frequency bands; and receive frequency band measurement information that the terminal device sends according to the frequency band configuration information, where the frequency band measurement information includes measurement information of the reference frequency band and measurement information of the all detection frequency bands.

The decision module 12 is configured to determine an available frequency band of the terminal device according to the frequency band measurement information.

In order to implement the frequency band scheduling method in the above-described embodiments, the network device provided in this embodiment has similar implementation principles and technical effects to those of the above-described embodiments, and the details are not repeated here.

In an embodiment, the allocation module 10 is configured to: divide a frequency band of the first system into an interference-free frequency band and an interference frequency band; use the interference-free frequency band as the reference frequency band, and divide the interference frequency band into the at least one detection frequency band according to a granularity of the second system.

In an embodiment, the communication module 11 is configured to: periodically receive the measurement information of the reference frequency band sent by the terminal device; send a frequency band detection indication to the terminal device at an interference detection occasion; and receive the measurement information of the all detection frequency bands sent by the terminal device In an embodiment, when a number of detection frequency bands is equal to i, the decision module 12 is configured to: acquire j detection frequency bands satisfying a preset condition from i detection frequency bands according to the frequency band measurement information, where $i \geq 1$, $0 \leq j \leq i$, and i and j are integers; and use the j detection frequency bands and the reference frequency band as the available frequency band of the terminal device.

In an embodiment, the decision module 12 is configured to: determine whether a difference value between measurement information of an x-th detection frequency band and the measurement information of the reference frequency band is greater than a preset threshold; and indicate that the x-th detection frequency band does not satisfy the preset condition if the difference value between the measurement information of the x-th detection frequency band and the measurement information of the reference frequency band is greater than the preset threshold; and indicate that the x-th detection frequency band satisfies the preset condition if the difference value between the measurement information of the x-th detection frequency band and the measurement information of the reference frequency band is less than or equal to the preset threshold, where x is an integer, and x is gradually increased from 1 to i in units of 1.

In an embodiment, after the j detection frequency bands and the reference frequency band are configured as the available frequency band of the terminal device, the decision module 12 is further configured to use the reference frequency band as an the available frequency band of the terminal device in a case where a communication quality at a previous occasion of the terminal device is superior to a communication quality at a current occasion.

In an embodiment, the frequency band configuration information is a channel state indication-reference signal (CSI-RS) configuration, and the frequency band measurement information is channel state information.

FIG. 7 shows a schematic structural diagram of a terminal device provided in an embodiment. As shown in FIG. 7, the terminal device includes a communication module 20 and a measurement module 21.

The communication module 20 is configured to receive frequency band configuration information sent by a network device, where the frequency band configuration information includes configuration information of a reference frequency band and configuration information of all detection frequency bands, the reference frequency band is a frequency band in which a first system does not interfere with a second system with each other, and the detection frequency band is a frequency band in which the first system and the second system interfere with each other.

The measurement module 21 is configured to acquire frequency band measurement information according to the frequency band configuration information, where the frequency band measurement information includes measurement information of the reference frequency band and measurement information of the all detection frequency bands.

The communication module 20 is further configured to: send the frequency band measurement information to the network device; and receive an available frequency band sent by the network device.

In order to implement the frequency band scheduling method in the above-described embodiments, the terminal device provided in this embodiment has similar implementation principles and technical effects to those of the above-described embodiments, and the details are not repeated here.

In an embodiment, the measurement module 21 is configured to: periodically measure on the reference frequency band, and measure on the all detection frequency bands according to the frequency band detection indication.

In an embodiment, the frequency band configuration information is a channel state indication-reference signal (CSI-RS) configuration; and the frequency band measurement information is channel state information.

An embodiment of the present application further provides a communication node. The communication node includes a processor, and the processor is configured to implement, when executing a computer program, the method provided in any of the embodiments of the present application. For example, the device may be the network device provided in any of the embodiments of the present application, or may be the terminal device provided in any of the embodiments of the present application, which is not specifically limited in the present application.

Exemplarily, the following embodiments provide a schematic structural diagram of a communication node as a base station and a UE.

Figure 8:
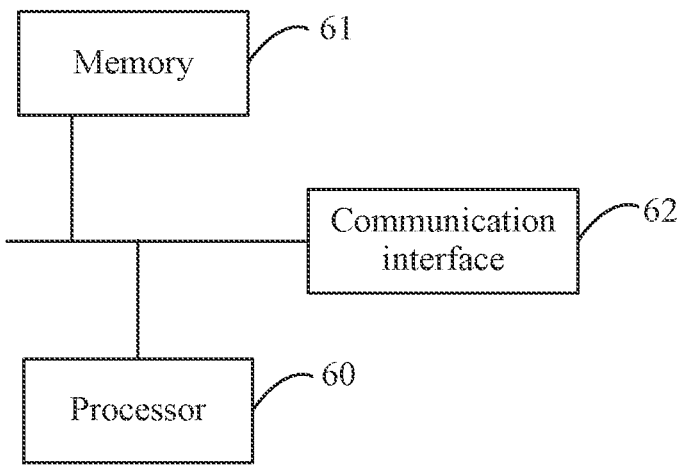
FIG. 8 is a schematic structural diagram of a base station provided in an embodiment.

FIG. 8 shows a schematic structural diagram of a base station provided in an embodiment. As shown in FIG. 8, the base station includes a processor 60, a memory 61 and a communication interface 62. A number of processors 60 in the base station may be one or more, and one processor 60 is configured as an example in FIG. 8. The processor 60, the memory 61 and the communication interface 62 in the base station may be connected by a bus or other manners, and they being connected by a bus is configured as an example in FIG. 8. The bus represents one or more of several types of bus structures, including a memory bus or a memory controller, a peripheral bus, an accelerated graphics port, a processor or a local bus using any of a variety of bus structures.

The memory 61, which serves as a computer-readable storage medium, may be configured to store software programs, computer-executable programs, and modules such as program instructions/modules corresponding to the methods in the embodiments of the present application. The processor 60 performs at least one functional application and data processing of the base station by running software programs, instructions and modules stored in the memory 61, i.e., implements the method described above.

The memory 61 may include a storage program region and a storage data region, where the storage program region may store an operating system, an application program required for at least one function, and the storage data region may store data created according to the use of the terminal, and the like. Moreover, the memory 61 may include high-speed random access memory, and may also include a non-volatile memory such as at least one magnetic disk storage device, a flash memory device, or other non-volatile solid-state memory devices. In some instances, the memory 61 may include a memory remotely disposed with respect to the processor 60, and the remote memory may be connected to the base station through a network. Instances of such networks include, but are not limited to, an Internet, an intranet, a network, a mobile communications network, and combinations thereof.

The communication interface 62 may be configured to receive and send data.

Figure 9:
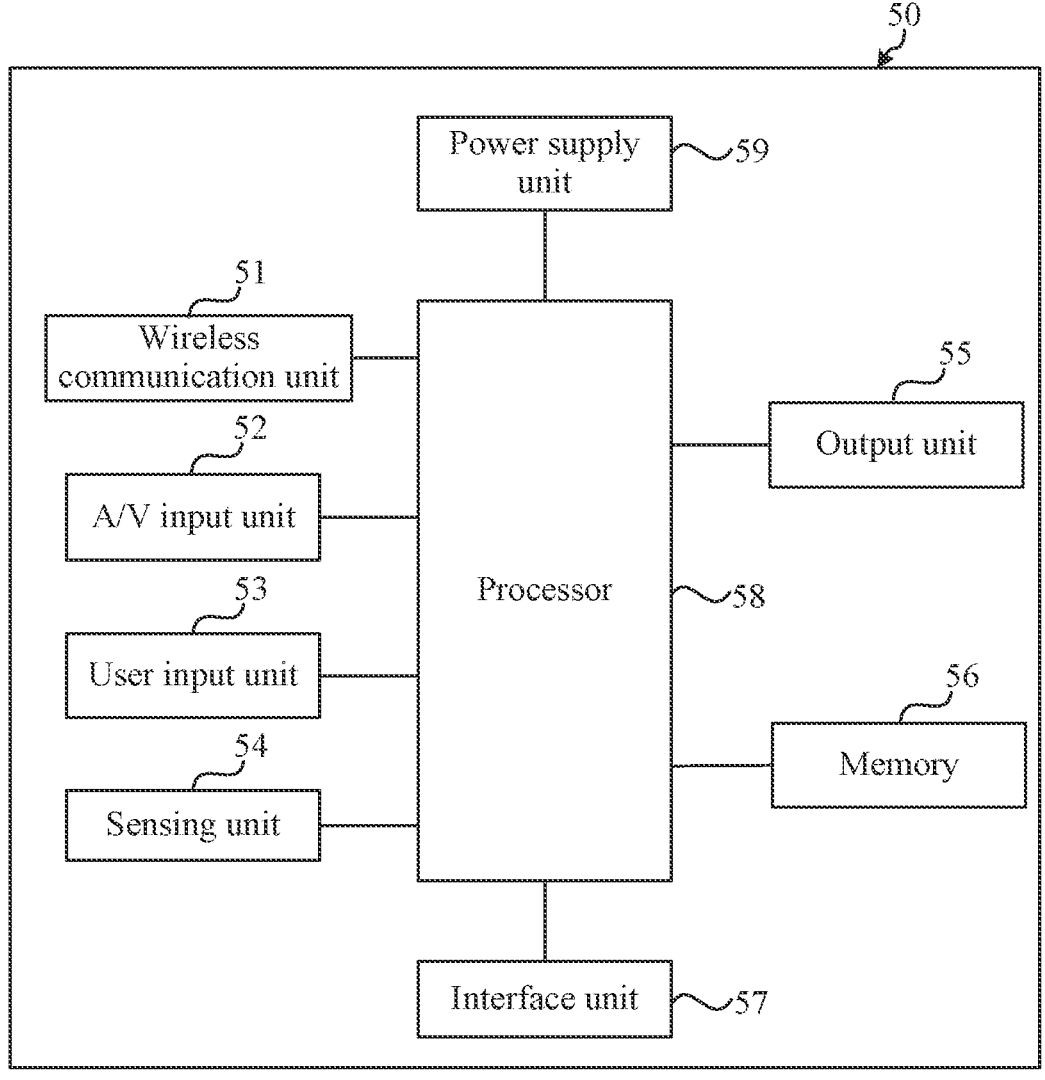
FIG. 9 is a schematic structural diagram of a UE provided in an embodiment.

FIG. 9 shows a schematic structural diagram of a UE provided in an embodiment, the UE may be implemented in various forms, the UE in the present application may include, but is not limited to, a mobile terminal device such as a mobile phone, a smart phone, a laptop computer, a digital broadcast receiver, a personal digital assistant (PDA), a portable device (PAD), a portable media player (PMP), a navigation apparatus, a vehicle-mounted terminal device, a vehicle-mounted display terminal, and a vehicle-mounted electronic rearview mirror, and a fixed terminal device such as a digital television (TV) and a desktop computer.

As shown in FIG. 9, the UE 50 may include a wireless communication unit 51, an audio/video (A/V) input unit 52, a user input unit 53, a sensing unit 54, an output unit 55, a memory 56, an interface unit 57, a processor 58, a power supply unit 59, and the like. FIG. 9 shows a UE including a variety of assemblies, but it should be understood that not all shown assemblies are required to be implemented. More or fewer assemblies may alternatively be implemented.

In this embodiment, the wireless communication unit 51 allows the radio communication between the UE 50 and the base station or the network. The A/V input unit 52 is configured to receive an audio signal or a video signal. The user input unit 53 may generate key input data according to a command input by the user so as to control various operations of the UE 50. The sensing unit 54 detects a current state of the UE 50, a position of the UE 50, the presence or absence of a touch input of the UE 50 by the user, an orientation of the UE 50, an acceleration or deceleration movement and direction of the UE 50, and the like, and the sensing unit 54 generates a command or a signal for controlling an operation of the UE 50. The interface unit 57 serves as an interface through which at least one external apparatus may be connected to the UE 50. The output unit 55 is configured to provide an output signal in a visual, audio and/or tactile manner. The memory 56 may store processes executed by the processor 58 and software programs controlling operations and the like, or may temporarily store data that has been output or is to be output. The memory 56 may include at least one type of storage medium. Moreover, the UE 50 may cooperate with a network storage apparatus that performs the storage function of the memory 56 over a network connection. The processor 58 generally controls the overall operation of the UE 50. The power supply unit 59 receives external power or internal power under the control of the processor 58 and provides appropriate power required for operating various elements and assemblies.

The processor 58 executes at least one functional application and data processing by running the programs stored in the memory 56, for example, so as to implement the methods provided in the embodiments of the present application.

An embodiment of the present application further provides a computer-readable storage medium. The computer-readable storage medium stores a computer program, and the computer program, when executed by a processor, implements the method provided in any of the embodiments of the present application.

The computer storage media of the embodiments of the present application may adopt any combination of one or more computer-readable media. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or device, or any combination of the foregoing. The computer-readable storage medium include (a non-exhaustive list): an electrical connection having one or more wires, a portable computer diskette, a hard disk, a random access memory (RAM), a read-only memory (ROM), an erasable programmable read-only memory (EPROM), a flash memory, an optical fiber, a portable compact disc read-only memory (CD-ROM), an optical storage device, a magnetic storage device, or any suitable combination of the foregoing. In the present application, the computer-readable storage medium may be any tangible medium that contains or stores a program for use by or in connection with an instruction execution system, apparatus, or device.

The computer-readable signal medium may include a propagated data signal with a computer-readable program code carried therein, for example, in a baseband or as part of a carrier wave. Such a propagated data signal may adopt a variety of forms, including, but not limited to: an electromagnetic signal, an optical signal, or any suitable combination of the foregoing. The computer-readable signal medium may also be any computer-readable medium that is not a computer-readable storage medium and that may send, propagate, or transmit a program for use by or in connection with an instruction execution system, apparatus, or device.

Program codes embodied on the computer-readable medium may be transmitted using any appropriate medium, including but not limited to: wireless, wire, optic cable, radio frequency (RF), etc., or any suitable combination of the foregoing.

A computer program code for performing operations of the present application may be written in one or more programming languages or combinations thereof, the described programming languages include an object-oriented programming language (such as Java, Smalltalk, C++, Ruby, Go) and further include a conventional procedural programming language (such as a "C" language or similar programming language). The program code may be executed in following manners: executed entirely on a user's computer, executed partly on the user's computer, executed as an independent software package, executed partly on the user's computer and partly on a remote computer, or executed entirely on the remote computer or a server. In a case where the remote computer is involved, the remote computer may be connected to the user's computer through any kind of network (including a local area network (LAN) or a wide area network (WAN)), or may be connected to an external computer (for example, connected to the external computer through an internet provided by an internet service provider).

It should be appreciated by those skilled in the art that the term "user terminal" covers any suitable type of wireless user equipment, such as mobile phones, portable data processing apparatuses, portable web browsers or vehicle-mounted mobile stations.

In general, various embodiments of the present application may be implemented in hardware or special purpose circuits, software, logic or any combination thereof. For example, some aspects may be implemented in hardware, while other aspects may be implemented in firmware or software which may be executed by a controller, microprocessor or other calculation device, although the present application is not limited thereto.

Embodiments of the present application may be implemented by a data processor of a mobile device executing computer program instructions, for example, in a processor entity, or by hardware, or by a combination of software and hardware. The computer program instructions may be assembler instructions, instruction set architecture (ISA) instructions, machine instructions, machine-related instructions, microcode, firmware instructions, state setting data, or source or object codes written in any combination of one or more programming languages.

Any block diagram of the logic flow in the accompanying drawings of the present application may represent program steps, or may represent interconnected logic circuits, modules, and functions, or may represent a combination of program steps and logic circuits, modules, and functions. The computer program may be stored on a memory. The memory may be of any type suitable for the local technical environment and may be implemented using any suitable data storage technology, such as, but not limited to, a read-only memory (ROM), a random access memory (RAM), an optical memory apparatus and system (digital versatile disc (DVD) or CD disc). The computer-readable medium may include a non-instantaneous storage medium. The data processor may be of any type suitable for the local technical environment, such as, but not limited to, a general-purpose computer, a specialized computer, a microprocessor, a digital signal processor (DSP), an application specific integrated circuit (ASIC), a field programmable gate array (FPGA), and a processor based on a multi-core processor architecture.

What is claimed is:

1. A frequency band scheduling method, applied to a network device, comprising:

acquiring a reference frequency band and at least one detection frequency band, wherein the reference frequency band is a frequency band in which a first system does not interfere with a second system, and the at least one detection frequency band is a frequency band in which the first system and the second system interfere with each other;

sending frequency band configuration information to a terminal device, wherein the frequency band configuration information comprises configuration information of the reference frequency band and configuration information of all detection frequency bands;

receiving frequency band measurement information that the terminal device sends according to the frequency band configuration information, wherein the frequency band measurement information comprises measurement information of the reference frequency band and measurement information of the all detection frequency bands; and determining an available frequency band of the terminal device according to the frequency band measurement information;

wherein the acquiring the reference frequency band and the at least one detection frequency band comprises:

dividing a frequency band of the first system into an interference-free frequency band and an interference frequency band; and configuring the interference-free frequency band as the reference frequency band, and dividing the interference frequency band into the at least one detection frequency band according to a granularity of the second system.

2. The frequency band scheduling method of claim 1, wherein the receiving the frequency band measurement information that the terminal device sends according to the frequency band configuration information comprises:

periodically receiving the measurement information of the reference frequency band sent by the terminal device; and sending a frequency band detection indication to the terminal device at an interference detection occasion; and receiving the measurement information of the all detection frequency bands sent by the terminal device.

3. The frequency band scheduling method of claim 1, wherein in response to determining that a number of detection frequency bands is equal to i, the determining the available frequency band of the terminal device according to the frequency band measurement information comprises:

acquiring j detection frequency bands satisfying a preset condition from i detection frequency bands according to the frequency band measurement information, wherein i≥1, 0≤j≤i, and i and j are integers; and configuring the j detection frequency bands and the reference frequency band as the available frequency band of the terminal device.

4. The frequency band scheduling method of claim 3, wherein the acquiring the j detection frequency bands satisfying the preset condition from the i detection frequency bands comprises:

determining whether a difference value between measurement information of an x-th detection frequency band and the measurement information of the reference frequency band is greater than a preset threshold; and indicating that the x-th detection frequency band does not satisfy the preset condition based on a determination result that the difference value between the measurement information of the x-th detection frequency band and the measurement information of the reference frequency band is greater than the preset threshold; and indicating that the x-th detection frequency band satisfies the preset condition based on a determination result that the difference value between the measurement information of the x-th detection frequency band and the measurement information of the reference frequency band is less than or equal to the preset threshold, wherein x is an integer, and x is gradually increased from 1 to i in units of 1.

5. The frequency band scheduling method of claim 3, wherein in response to determining of j≥1, after the configuring the j detection frequency bands and the reference frequency band as the available frequency band of the terminal device, the method further comprises:

in response to determining that a communication quality at a previous occasion of the terminal device is superior to a communication quality at a current occasion, configuring the reference frequency band as an the available frequency band of the terminal device.

6. The frequency band scheduling method of claim 1, wherein the frequency band configuration information is a channel state information-reference signal (CSI-RS) configuration, and the frequency band measurement information is channel state information (CSI).

7. A non-transitory computer-readable storage medium, storing a computer program, wherein the computer program, when executed by a processor, implements the frequency band scheduling method of any one of claim 1.

8. A frequency band scheduling method, applied to a terminal device, comprising:

receiving frequency band configuration information sent by a network device, wherein the frequency band configuration information comprises configuration information of a reference frequency band and configuration information of all detection frequency bands, the reference frequency band is a frequency band in which a first system does not interfere with a second system with each other, and the detection frequency band is a frequency band in which the first system and the second system interfere with each other;

acquiring frequency band measurement information and sending the frequency band measurement information to the network device according to the frequency band configuration information, wherein the frequency band measurement information comprises measurement information of the reference frequency band and measurement information of the all detection frequency bands; and receiving an available frequency band sent by the network device;

wherein a frequency band of the first system is divided into an interference-free frequency band and an interference frequency band, the interference-free frequency band is configured as the reference frequency band, and the interference frequency band is divided into least one detection frequency band according to a granularity of the second system.

9. The frequency band scheduling method of claim 8, wherein the acquiring the frequency band measurement information and sending the frequency band measurement information to the network device comprises:

periodically measuring on the reference frequency band, and sending the measurement information of the reference frequency band to the network device;

receiving a frequency band detection indication sent by the network device at an interference detection occasion; and measuring on the all detection frequency bands according to the frequency band detection indication, and sending the measurement information of the all detection frequency bands to the network device.

10. The frequency band scheduling method of claim 8, wherein the frequency band configuration information is a channel state information-reference signal (CSI-RS) configuration; and the frequency band measurement information is channel state information (CSI).

11. A communication node, comprising a processor, wherein the processor is configured to, when executing a computer program, implement a frequency band scheduling method, wherein the frequency band scheduling method comprises:

acquiring a reference frequency band and at least one detection frequency band, wherein the reference frequency band is a frequency band in which a first system does not interfere with a second system, and the at least one detection frequency band is a frequency band in which the first system and the second system interfere with each other;

sending frequency band configuration information to a terminal device, wherein the frequency band configuration information comprises configuration information of the reference frequency band and configuration information of all detection frequency bands;

receiving frequency band measurement information that the terminal device sends according to the frequency band configuration information, wherein the frequency band measurement information comprises measurement information of the reference frequency band and measurement information of the all detection frequency bands; and determining an available frequency band of the terminal device according to the frequency band measurement information;

wherein the acquiring the reference frequency band and the at least one detection frequency band comprises:

dividing a frequency band of the first system into an interference-free frequency band and an interference frequency band; and configuring the interference-free frequency band as the reference frequency band, and dividing the interference frequency band into the at least one detection frequency band according to a granularity of the second system.

12. The communication node of claim 11, wherein the receiving the frequency band measurement information that the terminal device sends according to the frequency band configuration information comprises:

periodically receiving the measurement information of the reference frequency band sent by the terminal device; and sending a frequency band detection indication to the terminal device at an interference detection occasion; and receiving the measurement information of the all detection frequency bands sent by the terminal device.

13. The communication node of claim 11, wherein in response to determining that a number of detection frequency bands is equal to i, the determining the available frequency band of the terminal device according to the frequency band measurement information comprises:

acquiring j detection frequency bands satisfying a preset condition from i detection frequency bands according to the frequency band measurement information, wherein $i \geq 1$, $0 \leq j \leq i$, and i and j are integers; and configuring the j detection frequency bands and the reference frequency band as the available frequency band of the terminal device.

14. The communication node of claim 13, wherein the acquiring the j detection frequency bands satisfying the preset condition from the i detection frequency bands comprises:

determining whether a difference value between measurement information of an x-th detection frequency band and the measurement information of the reference frequency band is greater than a preset threshold; and indicating that the x-th detection frequency band does not satisfy the preset condition based on a determination result that the difference value between the measurement information of the x-th detection frequency band and the measurement information of the reference frequency band is greater than the preset threshold; and indicating that the x-th detection frequency band satisfies the preset condition based on a determination result that the difference value between the measurement information of the x-th detection frequency band and the measurement information of the reference frequency band is less than or equal to the preset threshold, wherein x is an integer, and x is gradually increased from 1 to i in units of 1.

15. The communication node of claim 13, wherein in response to determining of $j \geq 1$, after the configuring the j detection frequency bands and the reference frequency band as the available frequency band of the terminal device, the method further comprises:

in response to determining that a communication quality at a previous occasion of the terminal device is superior to a communication quality at a current occasion, configuring the reference frequency band as an the available frequency band of the terminal device.

16. The communication node of claim 11, wherein the frequency band configuration information is a channel state information-reference signal (CSI-RS) configuration, and the frequency band measurement information is channel state information (CSI).

\* \* \* \* \*